United States Patent
Jung et al.

(10) Patent No.: US 12,166,859 B2
(45) Date of Patent: *Dec. 10, 2024

(54) METHOD FOR FORMING VIRTUAL PRIVATE NETWORK PROVIDING VIRTUAL PRIVATE NETWORK THROUGH SEALED KEY EXCHANGE BASED ON POST QUANTUM CRYPTOGRAPHY AND SYSTEM FOR OPERATING VIRTUAL PRIVATE NETWORK PERFORMING SAME

(71) Applicant: NORMA Inc., Seoul (KR)

(72) Inventors: Hyunchul Jung, Seoul (KR); Chang Nyoung Song, Seoul (KR)

(73) Assignee: NORMA Inc., Seoul (KR)

( * ) Notice: Subject to any disclaimer, the term of this patent is extended or adjusted under 35 U.S.C. 154(b) by 176 days.

This patent is subject to a terminal disclaimer.

(21) Appl. No.: 18/079,898

(22) Filed: Dec. 13, 2022

(65) Prior Publication Data
US 2024/0080182 A1    Mar. 7, 2024

(30) Foreign Application Priority Data

Sep. 1, 2022    (KR) .......................... 10-2022-0110890

(51) Int. Cl.
*H04L 9/08*    (2006.01)
*H04L 9/14*    (2006.01)
(Continued)

(52) U.S. Cl.
CPC .......... *H04L 9/0819* (2013.01); *H04L 9/0852* (2013.01); *H04L 9/0869* (2013.01);
(Continued)

(58) Field of Classification Search
CPC ............. H04L 63/0272; H04L 63/0435; H04L 9/0825; H04L 9/0869; H04L 9/14;
(Continued)

(56) References Cited

U.S. PATENT DOCUMENTS 10,425,401 B1 *  9/2019  Pecen ................. H04L 63/0815
11,784,825 B2 * 10/2023  Masny ................. H04L 9/3247
                                                            713/176
(Continued)

FOREIGN PATENT DOCUMENTS

JP        2014126866 A       7/2014

OTHER PUBLICATIONS

Minha Kim et al., Open Source Code Analysis on Lattice Based Post Quantum Cryptography, Korea Information Security Society Winter Academy papers, Nov. 28, 2020.
(Continued)

*Primary Examiner* — Sharon S Lynch
(74) *Attorney, Agent, or Firm* — Nicholas Park

(57) ABSTRACT

The technical idea of the present invention relates to a method for forming virtual private network providing virtual private network through sealed key exchange based on post quantum cryptography and a virtual private network operating system performing same. A method for forming a virtual private network performed by a server according to an embodiment of the present invention comprises the steps of: generating a public key and a private key; transmitting the public key; receiving a key capsule corresponding to the public key; generating a verification capsule from the key capsule using the private key; generating a symmetric key by verifying the verification capsule; and performing communication through the virtual private network using the symmetric key.

5 Claims, 10 Drawing Sheets

(51) Int. Cl.
  *H04L 9/30*    (2006.01)
  *H04L 9/40*    (2022.01)

(52) U.S. Cl.
  CPC .............. *H04L 9/14* (2013.01); *H04L 9/3093* (2013.01); *H04L 63/0272* (2013.01); *H04L 63/0435* (2013.01)

(58) Field of Classification Search
  CPC ... H04L 9/3093; H04L 63/061; H04L 63/045; H04L 9/0819; H04L 9/0852; H04L 9/3247; H04L 9/40; H04L 2209/26; H04L 2463/062; H04L 63/12; H04L 9/0643; H04L 9/0838; H04L 9/0866
  See application file for complete search history.

(56) References Cited

U.S. PATENT DOCUMENTS

| | | | |
|---|---|---|---|
| 11,909,877 B2* | 2/2024 | Garcia Morchon | H04L 9/30 |
| 11,917,063 B2* | 2/2024 | Morchon | H04L 9/3093 |
| 2022/0078011 A1* | 3/2022 | Garcia Morchon | H04L 9/0841 |
| 2022/0231843 A1* | 7/2022 | Garcia Morchon | H04L 9/3093 |
| 2022/0353089 A1* | 11/2022 | Masny | H04L 9/3247 |
| 2023/0052293 A1* | 2/2023 | Morchon | H04L 9/3093 |
| 2023/0153070 A1* | 5/2023 | Garcia Morchon | G06F 17/16 708/254 |
| 2023/0412392 A1* | 12/2023 | Masny | H04L 9/0825 |

OTHER PUBLICATIONS

Yu-Jin Yang et al., Proposal of Bluetooth model with Post-Quantum Cryptography, Thesis at the Fall Conference of the Korea Information Processing Society, Nov. 4, 2021.

* cited by examiner

METHOD FOR FORMING VIRTUAL PRIVATE NETWORK PROVIDING VIRTUAL PRIVATE NETWORK THROUGH SEALED KEY EXCHANGE BASED ON POST QUANTUM CRYPTOGRAPHY AND SYSTEM FOR OPERATING VIRTUAL PRIVATE NETWORK PERFORMING SAME

CROSS-REFERENCE TO RELATED APPLICATION

This application claims priority to and the benefit of Korean Patent Application No. 10-2022-0110890, filed on Sep. 1, 2022, the disclosure of which is incorporated herein by reference in its entirety.

BACKGROUND

Technical Field

The present invention relates to a method for forming a virtual private network providing virtual private network by performing key exchange through key sealing based on post quantum cryptography and a virtual private network operating system performing the same.

Related Art

A Virtual Private Network (VPN) is a private communication network used by companies or organizations to communicate over a public network without revealing its contents to the outside, and may form a secure channel between devices using a special TCP/IP-based protocol called a tunneling protocol.

As a method for implementing a virtual private network, there is a virtual private network based on a secure sockets layer (SSL) that can be connected to an internal network regardless of a place or a type of a terminal. The SSL virtual private network encrypts information in communication between a web browser and a server, and thus, as a security solution having a function of protecting information even when the information is leaked through hacking, internal system resources can be safely used from a remote place to the Internet.

Meanwhile, with the development of quantum computers, security of an encryption algorithm used in an existing cryptosystem has been weakened, and accordingly, a need for a Post Quantum Cryptography (QM), which is an encryption algorithm in which security is maintained even by a quantum computer, has emerged, and a virtual private network also needs to be applied to a QM in which security is maintained even by a quantum computer.

SUMMARY

Technical Problem

The purpose of the present invention is to provide a method for forming a virtual private network and a virtual private network operating system, wherein the method performs key sealing by using post quantum cryptography when exchanging symmetric keys to provide a virtual private network.

Technical Solution

A method for forming a virtual private network performed by a server according to an embodiment of the present invention comprises the steps of: generating a public key and a private key; transmitting the public key; receiving a key capsule corresponding to the public key; generating a verification capsule from the key capsule using the private key; generating a symmetric key by verifying the verification capsule; and performing communication through the virtual private network using the symmetric key.

In an embodiment, the key capsule may be generated by sealing a randomly generated key message and a capsule random value generated through a hash for the key message using the public key.

In an embodiment, the generating of the verification capsule from the key capsule using the private key may include extracting a key message by opening the key capsule using the private key, generating an open random value by hashing the key message, and generating the verification capsule by sealing the key message and the open random value with the public key.

In an embodiment, the generating of the symmetric key by verifying the verification capsule may include: determining whether the verification capsule is the same as the key capsule; when the verification capsule is the same as the key capsule, generating a prekey through the key message and a hash of the public key; and generating the symmetric key through the key capsule and a hash of the prekey.

In an embodiment, the generating of the public key and the private key may include: defining a key matrix corresponding to a random polynomial ring; sampling a first key vector corresponding to a lattice and a second key vector having a first distance from the first key vector; and generating the public key and the private key using the key matrix, the first key vector, and the second key vector.

A method for forming a virtual private network according to an embodiment of the present invention comprises the steps of: receiving a public key; generating a key message by using a random number generator; generating a key capsule by using the key message; transmitting the key capsule; generating a symmetric key by using the key capsule; and performing communications through the virtual private network by using the symmetric key.

In an embodiment, the generating of the key capsule using the key message may include: generating a capsule random value through a hash for the key message; and generating the key capsule by sealing the key message and the capsule random value using the public key.

In an embodiment, the generating of the symmetric key using the key capsule may include: generating a prekey by hashing the key message and the public key; generating a key hash value by hashing the prekey and the key capsule; and generating the key hash value as the symmetric key.

In an embodiment, the public key may be generated by using a key matrix corresponding to a random polynomial ring, a first key vector sampled to correspond to a lattice, and a second key vector having a first distance from the first key vector.

DETAILED DESCRIPTION

Figure 1:
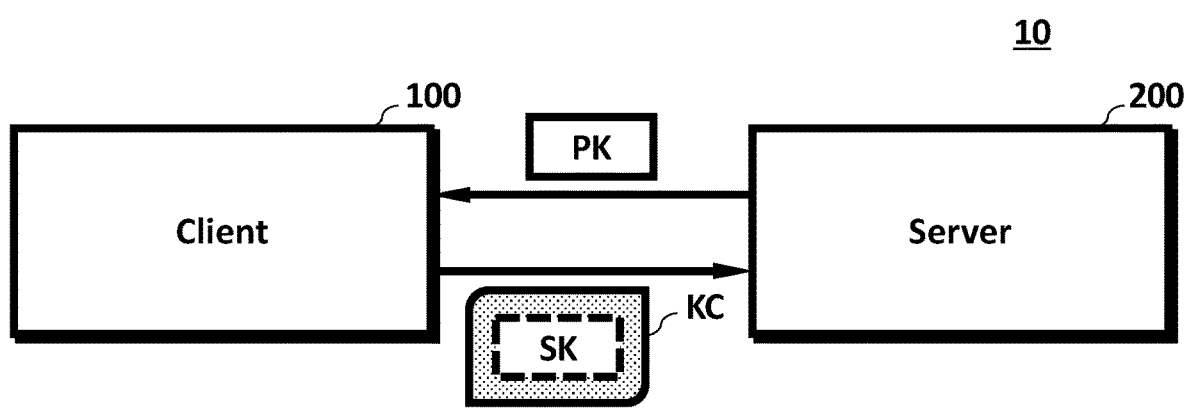
FIG. 1 is a block diagram illustrating a virtual private network operating system according to an example embodiment.

Hereinafter, exemplary embodiments of the present disclosure will be described in detail with reference to the accompanying drawings. Advantages and features of the present disclosure and methods of achieving them will become apparent with reference to embodiments described in detail below together with the accompanying drawings. However, the technical spirit of the present invention is not limited to the following embodiments, but may be implemented in various different forms, and the following embodiments are provided to complete the technical spirit of the present invention and to completely inform a person having ordinary skill in the art to which the present invention belongs of the scope of the present invention, and the technical spirit of the present invention is only defined by the scope of the claims.

In adding reference numerals to elements in each drawing, it should be noted that the same elements will be designated by the same reference numerals, if possible, even though they are shown in different drawings. In addition, in describing the present invention, when it is determined that a detailed description of related known configurations or functions may obscure the gist of the present invention, the detailed description thereof will be omitted.

Unless otherwise defined, all terms (including technical and scientific terms) used herein have the same meaning as commonly understood by one of ordinary skill in the art to which the inventive concept belongs. In addition, terms defined in commonly used dictionaries are not interpreted ideally or excessively unless they are clearly specifically defined. The terminology used herein is for the purpose of describing embodiments and is not intended to be limiting of the present invention. In the specification, a singular form includes a plural form unless specifically mentioned in the text.

In addition, in describing components of the present disclosure, terms such as first, second, A, B, (a), (b), and the like may be used. The term is used only to distinguish a component from another component, and the nature, sequence, or order of the corresponding component is not limited by the term. When it is described that a component is "connected", "coupled", or "connected" to another component, the component may be directly connected or connected to the other component, but it should be understood that another component may be "connected", "coupled", or "connected" between the components.

It will be further understood that the terms "comprises" and/or "comprising" used in the present invention do not preclude the presence or addition of one or more other components, steps, operations and/or elements, as mentioned.

Components included in any one embodiment and components including a common function may be described using the same name in another embodiment. Unless stated otherwise, the description described in any one embodiment may be applied to other embodiments, and the detailed description may be omitted within a redundant range or a range that can be obviously understood by a person having ordinary skill in the art.

Hereinafter, some embodiments of the present invention will be described in detail with reference to the accompanying drawings.

Hereinafter, the present invention will be described in detail with reference to preferred embodiments of the present invention and the accompanying drawings.

FIG. 1 is a block diagram illustrating a virtual private network operating system according to an example embodiment.

Referring to FIG. 1, the virtual private network operating system 10 may include a client 100 and a server 200. In an embodiment, the virtual private network operating system may operate the virtual private network (VPN) according to the SSL scheme, but the technical spirit of the present disclosure is not limited thereto.

The client 100 may be a terminal operated by a user who desires to communicate with the server 200 through the virtual private network (VPN). The client 100 may include various communication-enabled terminal devices such as a cellular phone, a smart phone, a laptop, a personal computer (PC), a navigation, a personal communication system (PCS), a global system for mobile communications (GSM), a personal digital cellular (PDC), a personal handyphone system (PHS), a personal digital assistant (PDA), an international mobile telecommunication (IMT)-2000, a code division multiple access (CDMA)-2000, a W-code division multiple access (W-CDMA), a wireless broadband Internet (Wibro) terminal, a smart pad, a tablet PC, and the like.

The server 200 may include a server that provides various data to the client 100 through a virtual private network (VPN), an operating computer that operates the server, and the like, and in one example, may be implemented in a cloud. In an embodiment, the server 200 may transmit data to the client 100 by using an application program such as a website, an application, or the like.

Although not shown, the virtual private network operating system 10 may further include an authenticator. The authenticator may represent a terminal operated by an authority that issues a certificate to users, and may serve to verify the identity of a certificate holder in order to secure the trust of a transaction through the certificate.

Each configuration of the virtual private network operating system 10 may be connected to communicate with each other in a wired or wireless manner, and when connected in a wired manner, each configuration included in the virtual private network operating system 10 may communicate with each other using a serial method, and when connected in a wireless manner, each configuration included in the virtual private network operating system 10 may communicate with each other using a wireless communication network, and the wireless communication network may include a Local Area Network (LAN), a Wide Area Network (WAN), the World Wide Web (WWW), a wired/wireless data communication network, a telephone network, a wired/wireless television communication network, 3G, 4G, 5G, 3rd Generation Partnership Project (3GPP), a 5th Generation Partnership Project (5GPP), a Long Term Evolution (LTE), a World Interoperability for Microwave Access (WIMAX), Wi-Fi, Internet (Internet), a Local Area Network (LAN), a Wireless Local Area Network (Wireless LAN), a Wide Area (WAN) Examples of the network include a communication network, a satellite broadcasting network, an analog broadcasting network, a digital multimedia broadcasting (DMB) network, and the like, but are not limited thereto.

The server 200 may perform key exchange in response to the virtual private network generation request of the client 100. In an embodiment, the server 200 may transmit the public key PK generated by itself to the client 100, and the client 100 may generate a key capsule KC corresponding to the symmetric key SK by using the public key PK and transmit the key capsule KC to the server 200. The client 100 may generate the symmetric key SK by using the key capsule KC, and the server 200 may also generate the symmetric key SK by using the key capsule KC after the verification process for the key capsule KC.

In this specification, the key exchange refers to an operation of exchanging a symmetric key SK for encryption when the server 200 and the client 100 communicate using the virtual private network (VPN). Since the symmetric key SK is used for encryption when exchanging data, there is a high possibility that the symmetric key SK may be an attack target of an attacker such as a hacker in the key exchange process. A conventional key exchange scheme (for example, a Diffie-Hellman key exchange algorithm) has a problem in that a symmetric key SK is likely to be easily exposed by quantum computing.

According to the technical spirit of the present disclosure, post quantum cryptography for transmitting a key using a key capsule KC is utilized in a key exchange process, so that a symmetric key SK may be exchanged between the server 200 and the client 100 without exposing the symmetric key SK to an attacker.

In this specification, the operation of the virtual private network operating system and the components included therein may mean an operation performed by a processor included in each component based on a computer program including at least one instruction stored in a storage device included in each component, and the storage device may include a non-volatile memory, a volatile memory, a flash memory, a hard disk drive (HDD), a solid state drive (SSD), or the like. The processor may include at least one of a Central Processing Unit (CPU), a Graphic Processing Unit (GPU), a Neural Processing Unit (NPU), a RAM, a ROM, a system bus, and an application processor.

Figure 2:
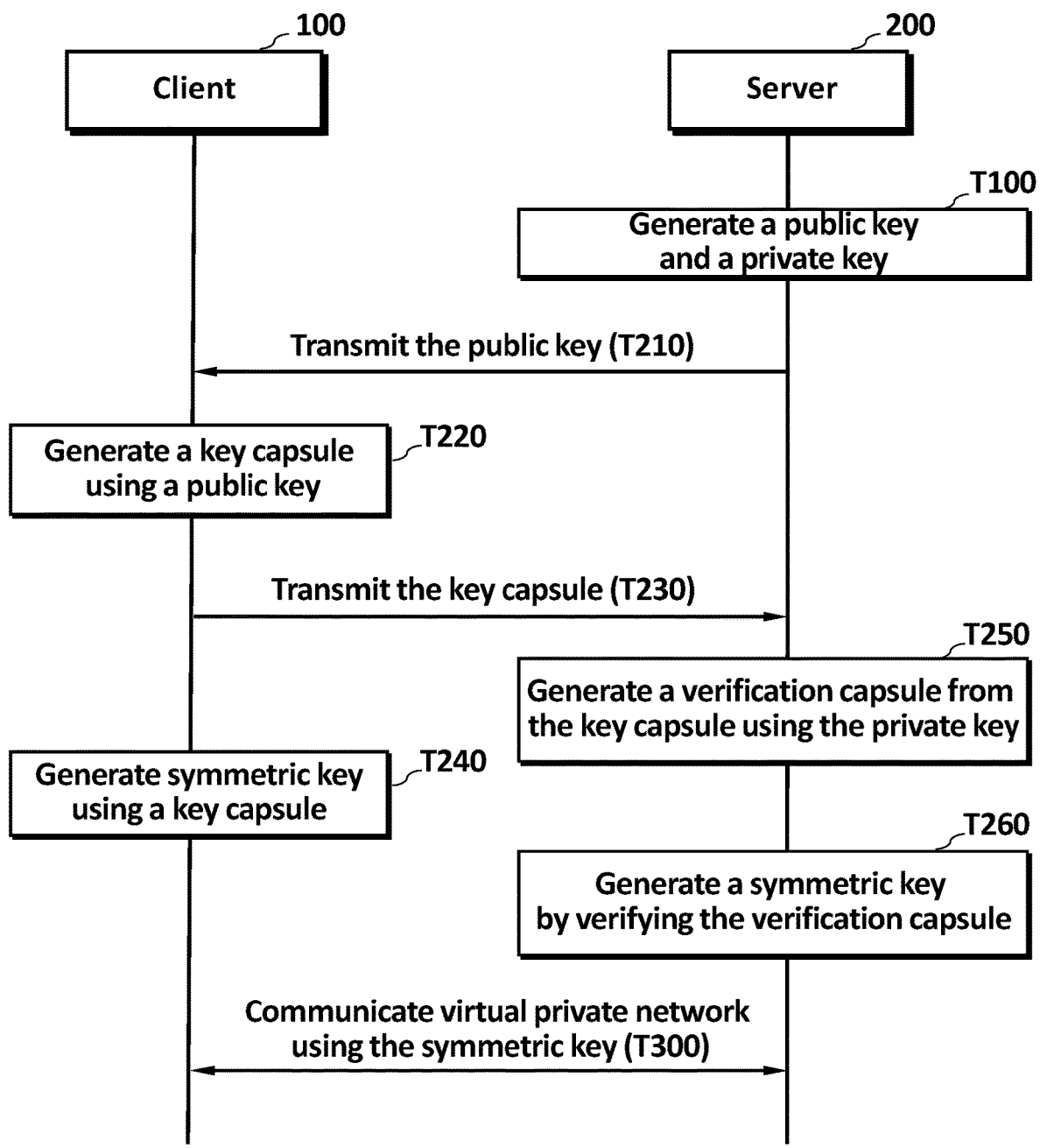
FIG. 2 is a flowchart illustrating a method of operating a virtual private network operating system according to an example embodiment.

FIG. 2 is a flowchart illustrating a method of operating a virtual private network operating system according to an example embodiment.

Referring to FIG. 2, the server 200 may generate a public key and a private key in response to the request of the client 100 to form the virtual private network (VPN) T100. In an embodiment, the server 200 may generate a public key and a private key by using a lattice-based algorithm, which will be described in detail later with reference to FIGS. 7 to 9.

The server 200 may transmit the generated public key to the client 100 T210. The client 100 may generate a key capsule using the received public key T220. In the present specification, the sealing refers to an operation of concealing information that does not need to be exposed to the outside by enclosing the information like a capsule by generating a data path that can be accessed only by a subject having a public key by using the public key, and the opening refers to an operation of confirming the sealed information by using the public key or a private key corresponding to the public key. The client 100 may generate a key capsule by sealing a key message corresponding to a random value by using a public key, and the like, and a detailed description thereof will be described in detail later with reference to FIG. 3.

The client 100 may transmit the generated key capsule to the server 200 T230, and generate a symmetric key by using the generated key capsule T240. Also, the server 200 may generate a verification capsule from the key capsule by using the private key corresponding to the public key T250. The server 200 may generate the symmetric key by verifying the verification capsule generated from the key capsule T260. After the key exchange is completed, the server 200 and the client 100 may perform communication using the virtual private network (VPN) by using the symmetric key T300.

According to the technical spirit of the present disclosure, by performing a key exchange using a public key and a private key generated based on a lattice, even if an attacker attacks the key exchange during the key exchange process between the client 100 and the server 200, information on the key may not be leaked.

Further, according to the technical spirit of the present disclosure, by generating a symmetric key by transmitting and receiving only a key capsule with double increased security by re-sealing the random value, an exchange of the symmetric key may be performed only by transmitting and receiving the key capsule without transmitting and receiving the symmetric key itself. As a result, even though the key capsule is exposed, information on the symmetric key is not exposed and security may be increased as the key exchange is finished.

Figure 3:
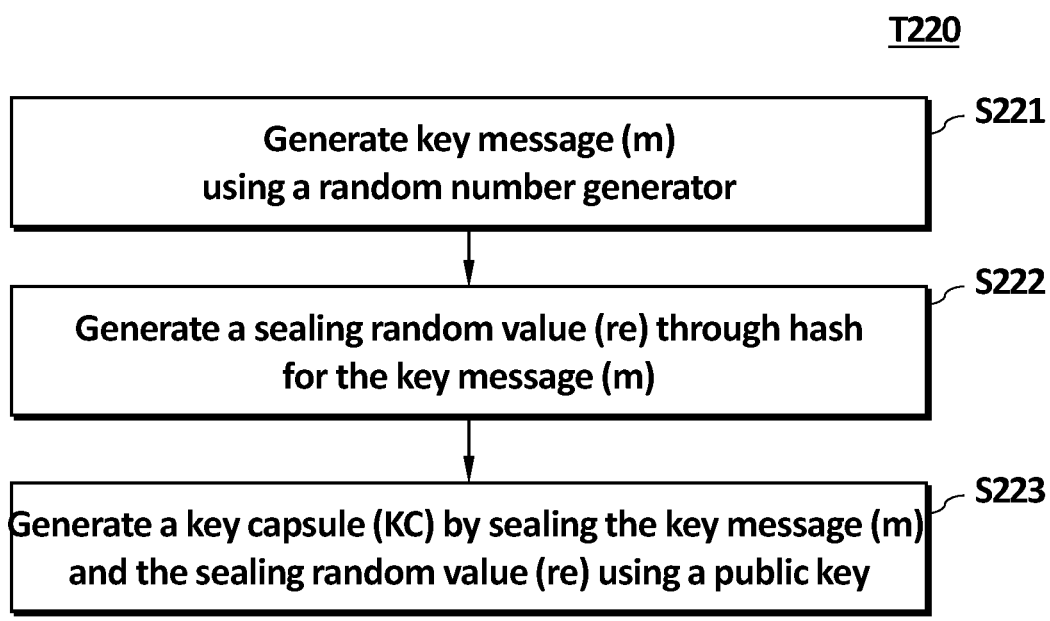
FIG. 3 is a flowchart illustrating a virtual private network key exchange method according to an example embodiment.

FIG. 3 is a flowchart illustrating a virtual private network key exchange method according to an example embodiment. In detail, FIG. 3 illustrates a key capsule generation method T220 of the client 100 of FIG. 2.

Referring to FIG. 3, the client 100 may generate a key message m using a random number generator S221. The random number generator refers to a device for generating a random number or symbol that cannot be theoretically predicted based on entropy, and may include a non-deterministic random bit generator (NRBG) and a deterministic random bit generator (DRBG) according to a noise source to be used. In addition, the key message m is data in which a plurality of bits generated using the random number generator are listed, and may be generated as 256 bit in one example.

The client 100 may generate a capsule random value re by hashing the key message m S221. The client 100 may generate a key capsule KC by sealing the key message m and the capsule random value reusing the public key S223.

According to an exemplary embodiment of the present disclosure, the client 100 may generate a key message m generated as a random value and a capsule random value re, which is a hash value for the key message m, and seal the key message m and the capsule random value re by using the public key once again, thereby maximizing security of the generated key capsule KC and accurately performing an operation in which the server 200 verifies the key capsule KC by using the key message m and the capsule random value re.

Figure 4:
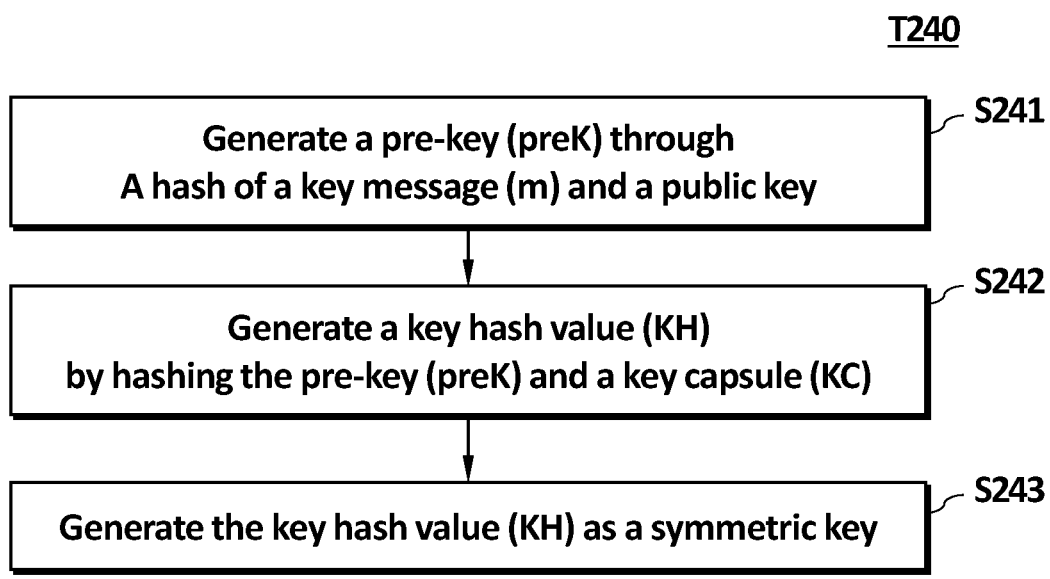
FIG. 4 is a flowchart illustrating a virtual private network key exchange method according to an example embodiment.

FIG. 4 is a flowchart illustrating a virtual private network key exchange method according to an example embodiment. In detail, FIG. 4 illustrates a symmetric key generation method T240 of the client 100 of FIG. 2.

Referring to FIG. 4, the client 100 may generate a pre-key preK through hash of a key message m generated using a random number generator and a public key S241. The client 100 may generate the key hash value KH by hashing the pre-key preK and the key capsule KC again S242. The client 100 may use the generated key hash value KH as a symmetric key S243.

According to the exemplary embodiment of the present disclosure, the client 100 may generate the pre-key preK by using the key message m shared with the server 200 and the public key, and generate the key hash value KH that is the symmetric key by using the key capsule KC shared with the server 200 and the pre-key preK, so that even when the key capsule KC is exposed to an attacker using quantum computing in the process of generating the same symmetric key as the server 200, the symmetric key may not be exposed to the attacker because the symmetric key is generated by using the pre-key preK that is not exposed to the attacker, and stability of key exchange may be increased.

Figure 5:
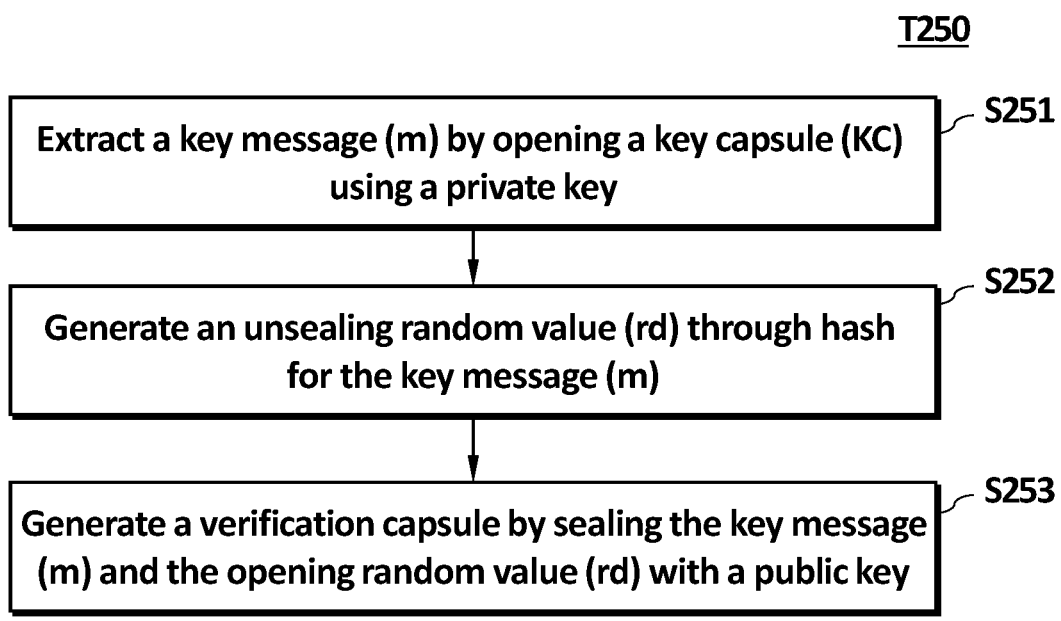
FIG. 5 is a flowchart illustrating a virtual private network key exchange method according to an example embodiment.

FIG. 5 is a flowchart illustrating a virtual private network key exchange method according to an example embodiment. In detail, FIG. 5 illustrates a verification capsule generation method T250 of the server 200 of FIG. 2.

Referring to FIG. 5, the server 200 may extract the key message m by opening the key capsule KC using the private key S251. Since the key capsule KC is sealed by the public key, the key message m may be normally extracted by using the private key corresponding to the public key.

The server 200 may generate an open random value rd through hash for the key message m S252. In an embodiment, since the output is the same when the inputs are the same in the case of the hash function, when data is not modified by an attacker in the process of transmitting the key capsule KC from the client 100 to the server 200, the server 200 may receive the key message m transmitted from the client 100 in the same manner, and the open random value rd according to the same may be the same as the capsule random value re.

The server 200 may generate a verification capsule by sealing the key message m and the open random value rd with the public key S253. In an embodiment, when data transformation is not performed in the process of transmitting the public key from the server 200 to the client 100, since the public key utilized by the client 100 and the public key utilized by the server 200 are the same, the verification capsule sealed using the public key may be the same as the key capsule KC received from the client 100.

Figure 6:
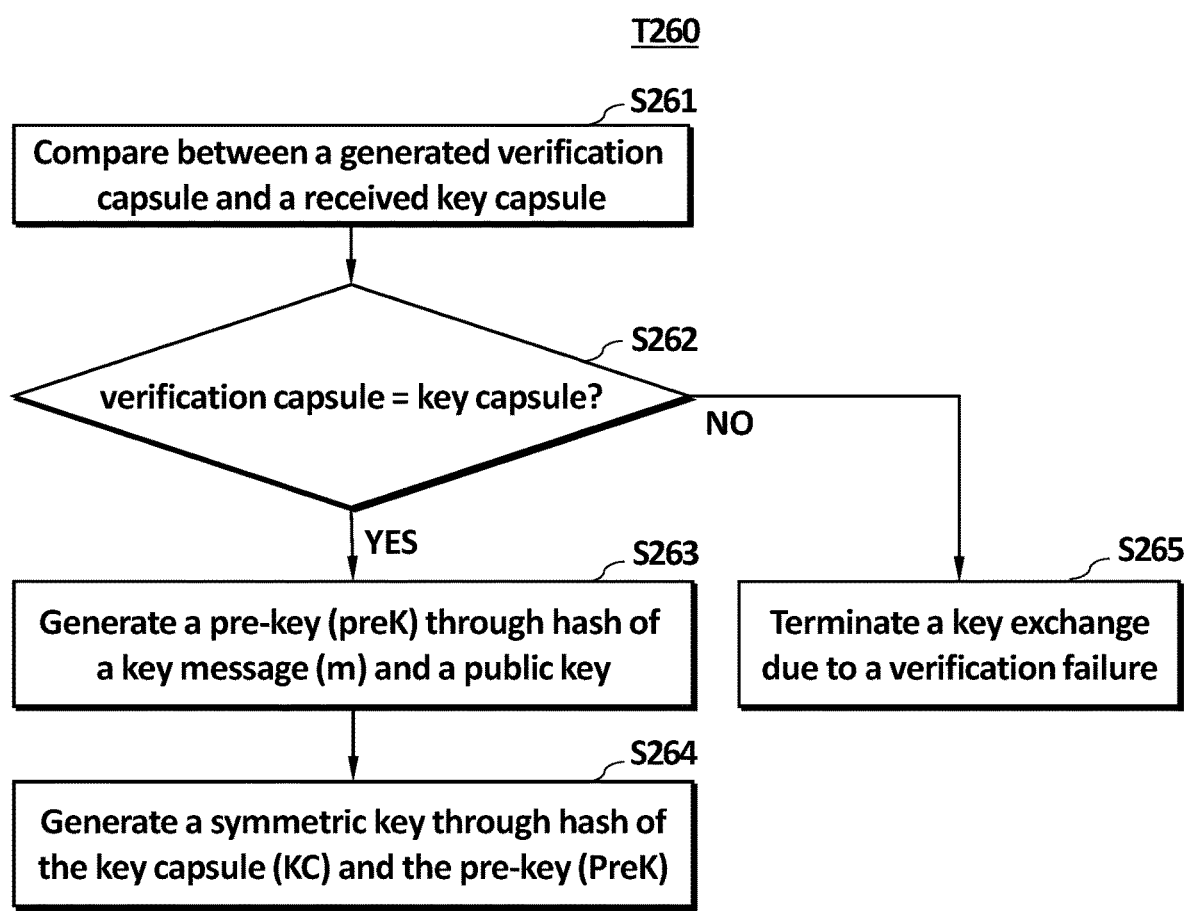
FIG. 6 is a flowchart illustrating a virtual private network key exchange method according to an example embodiment.

FIG. 6 is a flowchart illustrating a virtual private network key exchange method according to an example embodiment. In detail, FIG. 6 illustrates a symmetric key generation method T260 of the server 200 of FIG. 2.

Referring to FIG. 6, the server 200 may compare the generated verification capsule with the received key capsule KC S261. As described above, the verification capsule and the key capsule KC may be the same only when the attack of the attacker on the public key and the key capsule is not made, and when the verification capsule and the key capsule KC are the same, it may be guaranteed that the key capsule KC of the client 100 and the key capsule KC of the server 200 are the same.

According to an embodiment of the present disclosure, the verification of the key exchange is performed by using the key capsule KC and the verification capsule, so that the data deformation attack from the attacker can be detected in advance, and the security of the virtual private network can be increased.

Therefore, when the verification capsule and the key capsule KC are the same, the server 200 may generate the pre-key preK through the hash for the key message m and the public key in the same manner as the symmetric key generation method of the client described in FIG. 4 S263, generate the symmetric key through the hash for the key capsule KC and the pre-key preK S264, and when the verification capsule and the key capsule KC are not the same, the server 200 may terminate the key exchange due to the verification failure S265 and may not generate the virtual private network.

According to an embodiment of the present disclosure, even when the key capsule KC is exposed to an attacker using quantum computing in the process of generating the same symmetric key as the client 100, the symmetric key may not be exposed to the attacker and the stability of key exchange may be increased because the symmetric key is generated by using the pre-key preK not exposed to the attacker.

Figure 7:
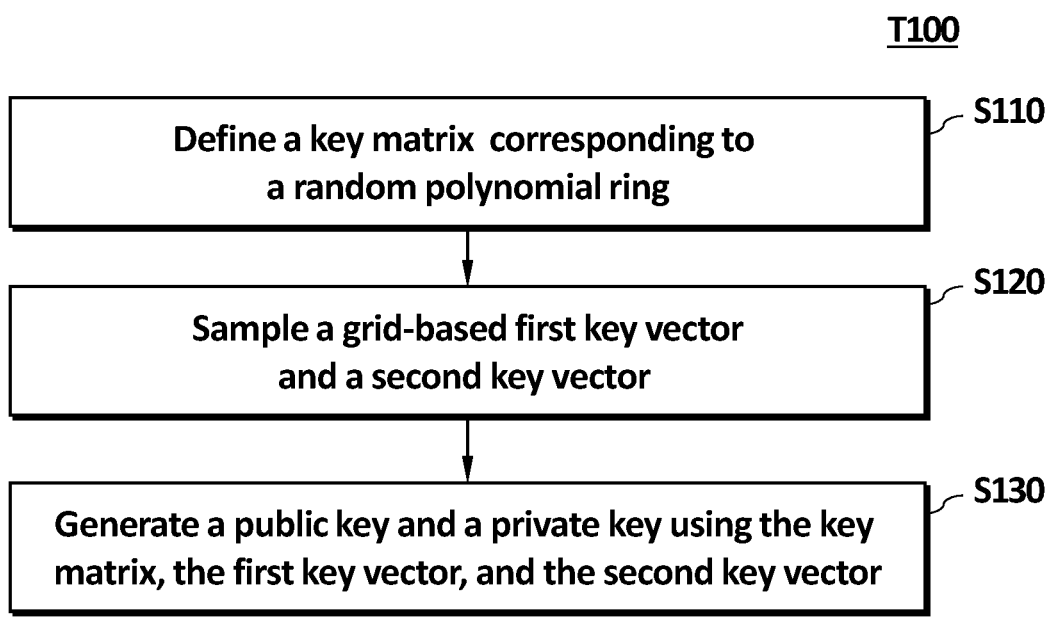
FIG. 7 is a flowchart illustrating a post quantum key generation algorithm according to an example embodiment.

FIG. 7 is a flowchart illustrating a post quantum key generation algorithm according to an example embodiment. In detail, FIG. 7 is a diagram illustrating the key generation method T100 of FIG. 2 in detail.

Referring to FIG. 7, the server 200 may define a key matrix corresponding to the random polynomial ring S110. The polynomial ring may refer to a ring viewed from an abstract algebraic point of view with respect to a polynomial having a real number and a complex number as coefficients and an unknown number, and the random polynomial ring may refer to a polynomial ring of which coefficients are randomly determined. In addition, the key matrix corresponding to this may mean that the coefficient of the random polynomial ring is represented as a matrix.

The server 200 may sample the first key vector and the second key vector by using a lattice-based algorithm S120. The lattice-based algorithm refers to an encryption algorithm based on mathematical problems on a lattice called a lattice problem, and the lattice problem includes a Shortest Vector Problem (SVP), a Shortest Independent Vectors Problem (SIVP), and a Closest Vector Problem (CVP). The security of the lattice-based algorithm is based on the fact that it is difficult to solve the above-described lattice problem, and since it is difficult to find a lattice point closest to an arbitrary position in a lattice of hundreds of dimensions, if a key is matched to the corresponding lattice point, it is difficult to find a private key corresponding to the position through quantum computing, and thus the lattice-based algorithm may be an alternative. In one example, if any location on the lattice corresponds to a public key and a particular location close to the public key corresponds to a private key, the private key can be hidden at the intersection of the multidimensional lattice, the number of possibilities of shortest vectors for the private key is infinite, and the process of traversing the range of possibilities and the number of permutations in the quantum computer cannot take advantage of the advantages of the quantum computer over the existing computer due to its complex nature. That is, the encryption key may be determined only when the attacker knows his or her own path through the lattice, that is, the attacker has no way to calculate the path, so it may be said that it is theoretically impossible for the attacker to calculate the private key. In an embodiment, a Gaussian distribution method and a dejection sampling method may be used to sample key vectors among a plurality of vectors generated using the lattice-based algorithm.

The server 200 may generate a public key and a private key by using the generated key matrix, the first key vector, and the second key vector S130.

According to the technical idea of the present disclosure, a hacking attempt by quantum computing may be prevented by utilizing a lattice-based algorithm in a process of generating a key for the virtual private network (VPN), and accordingly, security of the virtual private network (VPN) may be increased.

Figure 8:
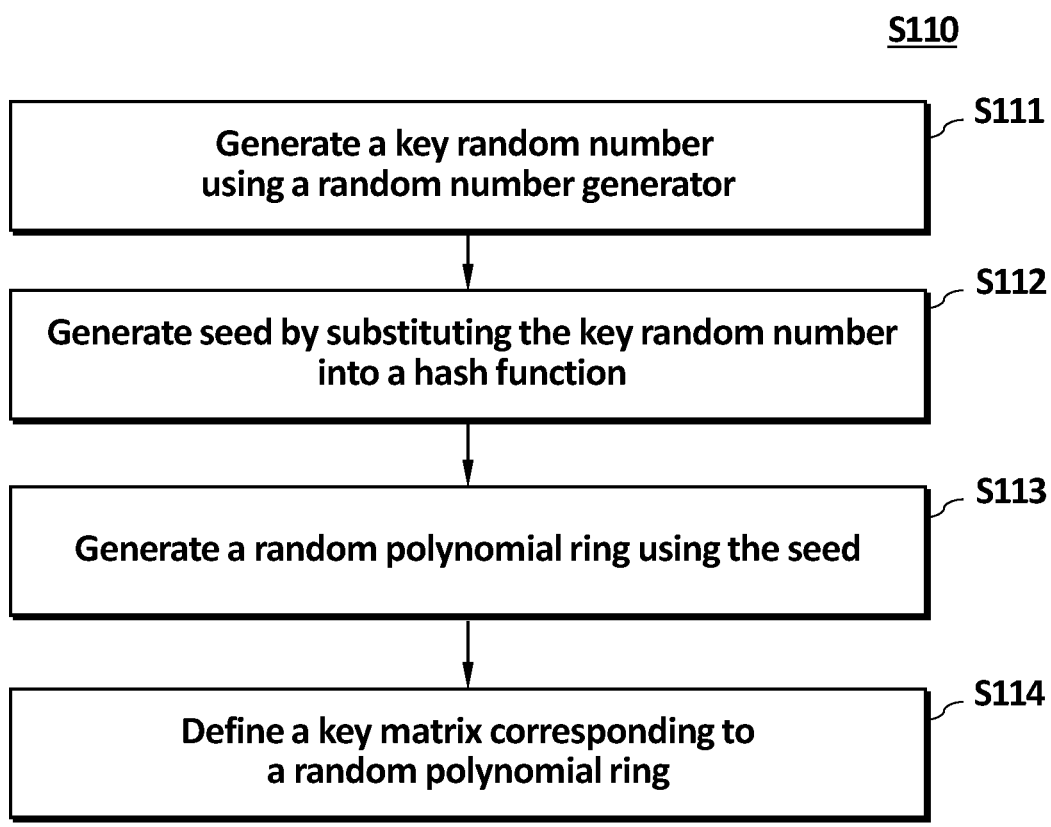
FIG. 8 is a flowchart illustrating a post quantum key generation algorithm according to an example embodiment.

FIG. 8 is a flowchart illustrating a post quantum key generation algorithm according to an example embodiment. In detail, FIG. 8 is a diagram illustrating the key matrix definition step S100 of FIG. 7 in detail.

Referring to FIG. 8, the server 200 may generate a key random number using a random number generator S111. The server 200 may generate a seed by substituting the key random number into a hash function S112, and may generate a random polynomial ring using the seed S113. Also, the server 200 may define a key matrix corresponding to the random polynomial ring S114.

According to an exemplary embodiment of the present disclosure, when defining a key matrix, a random number generator, a hash function, and a random polynomial ring are used to maximize randomness of the key matrix, and as a result, randomness of a key may be maximized.

Figure 9:
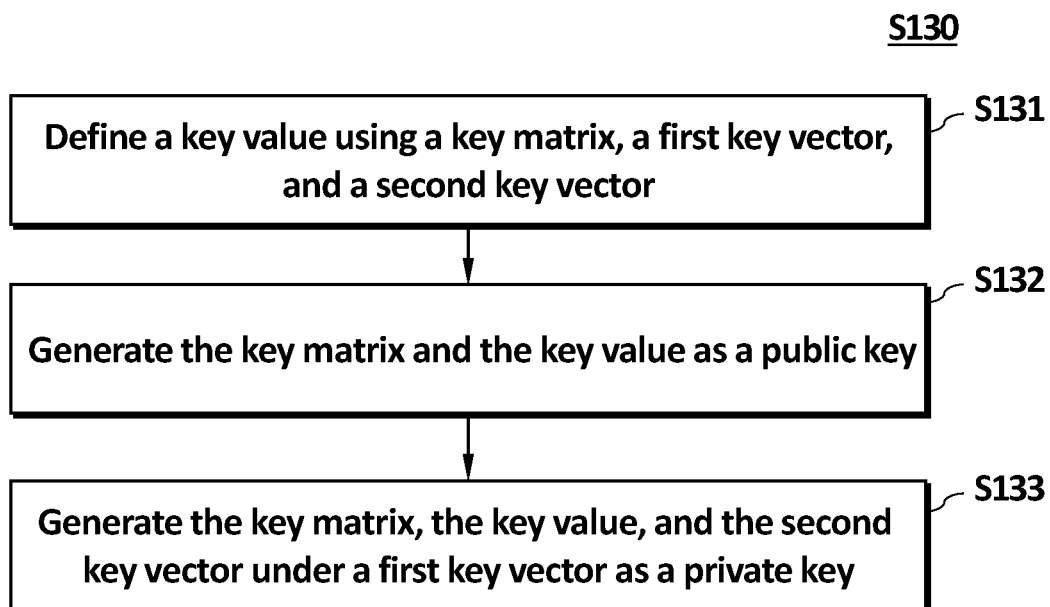
FIG. 9 is a flowchart illustrating a post quantum key generation algorithm according to an example embodiment.

FIG. 9 is a flowchart illustrating a post quantum key generation algorithm according to an example embodiment; In detail, FIG. 9 is a diagram illustrating the step S300 of generating a public key and a private key of FIG. 7 in detail.

Referring to FIG. 9, the server 200 may define a key value by using a key matrix, a first key vector, and a second key vector S131. In one example, the key value k for the key matrix A, the first key vector v1, and the second key vector v2 may be defined as Equation 1 below.

$$k = A \cdot v1 + v2 \qquad \text{Equation 1}$$

The server 200 may generate a key matrix and a key value as a public key S132, and generate a key matrix, a key value, a first key vector, and a second key vector as a private key S133. In one example, the public key pk and the private key sk may be generated as shown in Equation 2 below.

$$pk = (A,k), sk = (A,k,v1,v2) \qquad \text{Equation 2}$$

The server 200 according to an embodiment of the disclosure may generate a public key and a private key using a key value defined using a lattice-based algorithm, may increase security of the public key by including a key vector in the private key, and may fully decode data using the private key.

Figure 10:
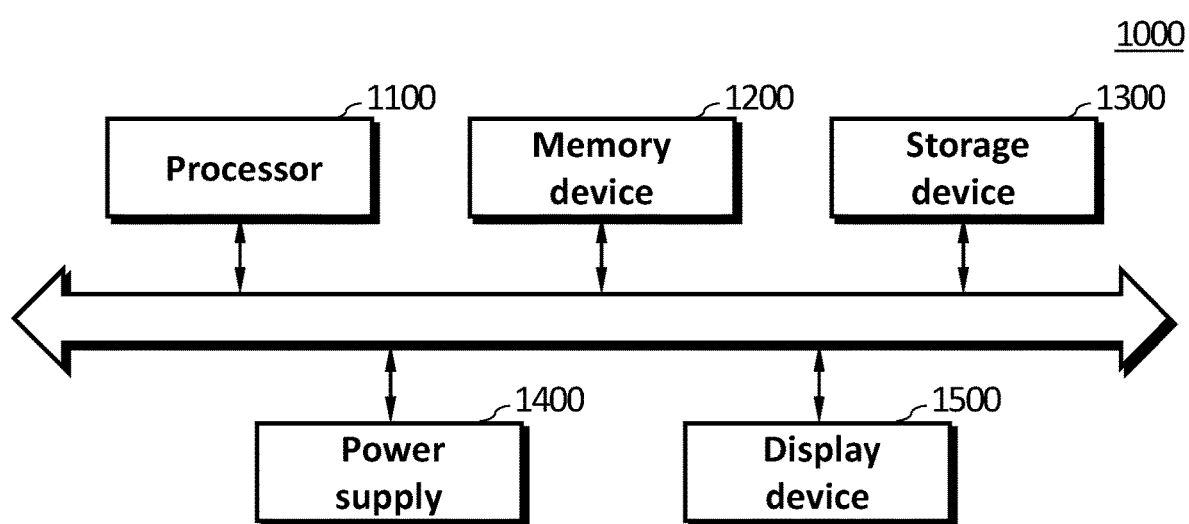
FIG. 10 is a block diagram of a computing system according to an example embodiment.

FIG. 10 is a block diagram of a computing system according to an example embodiment.

Referring to FIG. 10, the computing system 1000 may include any one of a server 200, a client 200, and a server 300, and may include a processor 1100, a memory device 1200, a storage device 1300, a power supply 1400, and a display device 1500. Although not illustrated in FIG. 10, the computing system 1000 may further include ports for communicating with a video card, a sound card, a memory card, a universal serial bus (USB) device, other electronic devices, etc.

As described above, the processor 1100, the memory device 1200, the storage device 1300, the power supply 1400, and the display device 1500 included in the computing system 1000 may configure any one of the server 200, the client 200, and the server 300 according to embodiments of the inventive concept to perform a method for forming a virtual private network. In detail, the processor 1100 may perform the operating method for the virtual private network operating system 10 described above with reference to FIGS. 1 to 9 by controlling the memory device 1200, the storage device 1300, the power supply 1400, and the display device 1500.

The processor 1100 may perform specific calculations or tasks. The processor 1100 may be a micro-processor or a Central Processing Unit (CPU). The processor 1100 may communicate with the memory device 1200, the storage device 1300, and the display device 1500 through a bus 1600 such as an address bus, a control bus, or a data bus. According to an embodiment, the processor 1100 may also be connected to an expansion bus such as a Peripheral Component Interconnect (PCI) bus.

The memory device 1200 may store data necessary for an operation of the computing system 1000. For example, the memory device 1200 may be implemented as a DRAM, a mobile DRAM, an SRAM, a PRAM, an FRAM, an RRAM, and/or an MRAM. The storage device 1300 may include a solid state drive, a hard disk drive, a CD-ROM, etc. The storage device 1300 may store programs, application program data, system data, operating system data, etc., related to the method for forming the virtual private network described above with reference to FIGS. 1 to 9.

The display device 1500 is an output means for notifying a user, and may notify a user or the like of information on a method for forming a virtual private network by displaying the information on the method. The power supply 1400 may supply an operating voltage required for an operation of the computing system 1000.

According to the technical idea of the present invention, in a process of exchanging a symmetric key to provide a virtual private network, by using post quantum cryptography including a lattice algorithm to seal a key, high security can be provided, and accordingly, a safe virtual private network which is not hacked by a quantum computer can be provided.

Exemplary embodiments have been invented in the drawings and specification as described above. Although embodiments have been described using specific terms in the present specification, they are used only for the purpose of describing the technical spirit of the present invention and are not used to limit the meaning or limit the scope of the present invention described in the claims. Therefore, it will be understood by those of ordinary skill in the art that various modifications and other equivalent embodiments are possible therefrom. Therefore, the true technical protection scope of the present invention should be determined by the technical spirit of the appended claims.

What is claimed is:

1. A method for forming a virtual private network performed by a server comprising a processor, the method comprising the steps of:
generating, by the processor, a public key and a private key;
transmitting, by the processor, the public key;
receiving, by the processor, a key capsule corresponding to the public key;
generating, by the processor, a verification capsule from the key capsule utilizing the private key;
generating, by the processor, a symmetric key by verifying the verification capsule; and
performing, by the processor, communication over the virtual private network utilizing the symmetric key,
wherein generating the symmetric key by verifying the verification capsule comprises the steps of:
determining, by the processor, whether the verification capsule is the same as the key capsule;
generating, by the processor, a prekey via a key message and a hash of the public key when the verification capsule is the same as the key capsule; and generating, by the processor, the symmetric key via the key capsule and a hash of the prekey, wherein generating, by the processor, the public key and the private key comprises the steps of:

defining, by the processor, a key matrix corresponding to a random polynomial ring; and sampling, by the processor, a first key vector generated by a lattice-based algorithm and a second key vector having a first distance from the first key vector.

2. The method for forming a virtual private network of claim 1, wherein the key capsule is generated by capsuling a randomly generated key message and a capsule random value generated by hashing the key message using the public key.

3. The method for forming a virtual private network claim 1, wherein the generating of the verification capsule from the key capsule using the private key comprises the steps of:

extracting, by the processor, a key message by opening the key capsule using the private key;

generating, by the processor, a release random value by hashing the key message; and generating, by the processor, the verification capsule by sealing the key message and the release random value with the public key.

4. A method for forming a virtual private network performed by a client including a processor, the method comprising the steps of:

receiving, by the processor, a public key;

generating, by the processor, a key message using a random number generator;

generating, by the processor, a key capsule using the key message;

transmitting, by the processor, the key capsule;

generating, by the processor, a symmetric key using the key capsule; and performing, by the processor, communication over the virtual private network using the symmetric key, wherein the generating of the symmetric key using the key capsule comprises the steps of:

generating, by the processor, a prekey by hashing the key message and the public key;

generating, by the processor, a key hash value by hashing the prekey and the key capsule; and generating, by the processor, the key hash value as the symmetric key, wherein the public key is generated using a key matrix corresponding to a random polynomial ring, a first key vector sampled corresponding to a lattice, and a second key vector having a first distance from the first key vector on the lattice.

5. The method for forming a virtual private network of claim 4, wherein the generating of the key capsule using the key message comprises the steps of:

generating, by the processor, a sealing random value by hashing the key message; and generating, by the processor, the key capsule by capsuling the key message and the capsule random value using the public key.

* * * * *